United States Patent [19]
Alpert

[11] Patent Number: 5,742,666
[45] Date of Patent: Apr. 21, 1998

[54] EMERGENCY MOBILE TELEPHONE

[75] Inventor: Martin Alpert, Cleveland, Ohio

[73] Assignee: Tele Digital Development, Inc., St. Paul, Minn.

[21] Appl. No.: 317,663

[22] Filed: Oct. 5, 1994

(Under 37 CFR 1.47)

[51] Int. Cl.$^6$ .................................................. H04Q 7/00
[52] U.S. Cl. .................... 379/58; 379/40; 379/59; 340/426; 340/990
[58] Field of Search .................... 379/58, 40, 59; 340/426, 990

[56] References Cited

U.S. PATENT DOCUMENTS

| | | | |
|---|---|---|---|
| 4,825,457 | 4/1989 | Lebowitz | 379/40 |
| 5,016,269 | 5/1991 | Rogers | 379/59 |
| 5,081,667 | 1/1992 | Drori et al. | 379/59 |
| 5,146,486 | 9/1992 | Lebowitz | 379/40 |
| 5,247,564 | 9/1993 | Zicker | 379/40 |
| 5,315,285 | 5/1994 | Nykerk | 340/426 |
| 5,327,478 | 7/1994 | Lebowitz | 379/40 |
| 5,334,974 | 8/1994 | Simms et al. | 340/990 |
| 5,365,570 | 11/1994 | Boubelik | 379/59 |
| 5,454,024 | 9/1995 | Lebowitz | 379/40 |
| 5,555,286 | 9/1996 | Tendler | 379/59 |

*Primary Examiner*—William Cumming
*Attorney, Agent, or Firm*—Westman, Champlin & Kelly, P.A.

[57] ABSTRACT

The cellular mobile telephone and system is provided wherein the cellular telephone automatically dials one or more prescribed emergency telephone numbers in the event of an emergency. Automatic dialing of an emergency telephone number is initiated by the user pressing a dedicated push button on the cellular telephone handset, or alternatively, upon the occurrence of an accident which is detected by the cellular telephone. After the cellular telephone dials the predetermined emergency number, the cellular telephone plays a recorded message which indicates that an emergency has occurred and that the telephone user is in distress. Alteratively, the cellular telephone user is allowed to participate in the emergency call upon receiving notification that the cellular telephone has successfully completed the automatic dialing and a connection has been established.

9 Claims, 10 Drawing Sheets

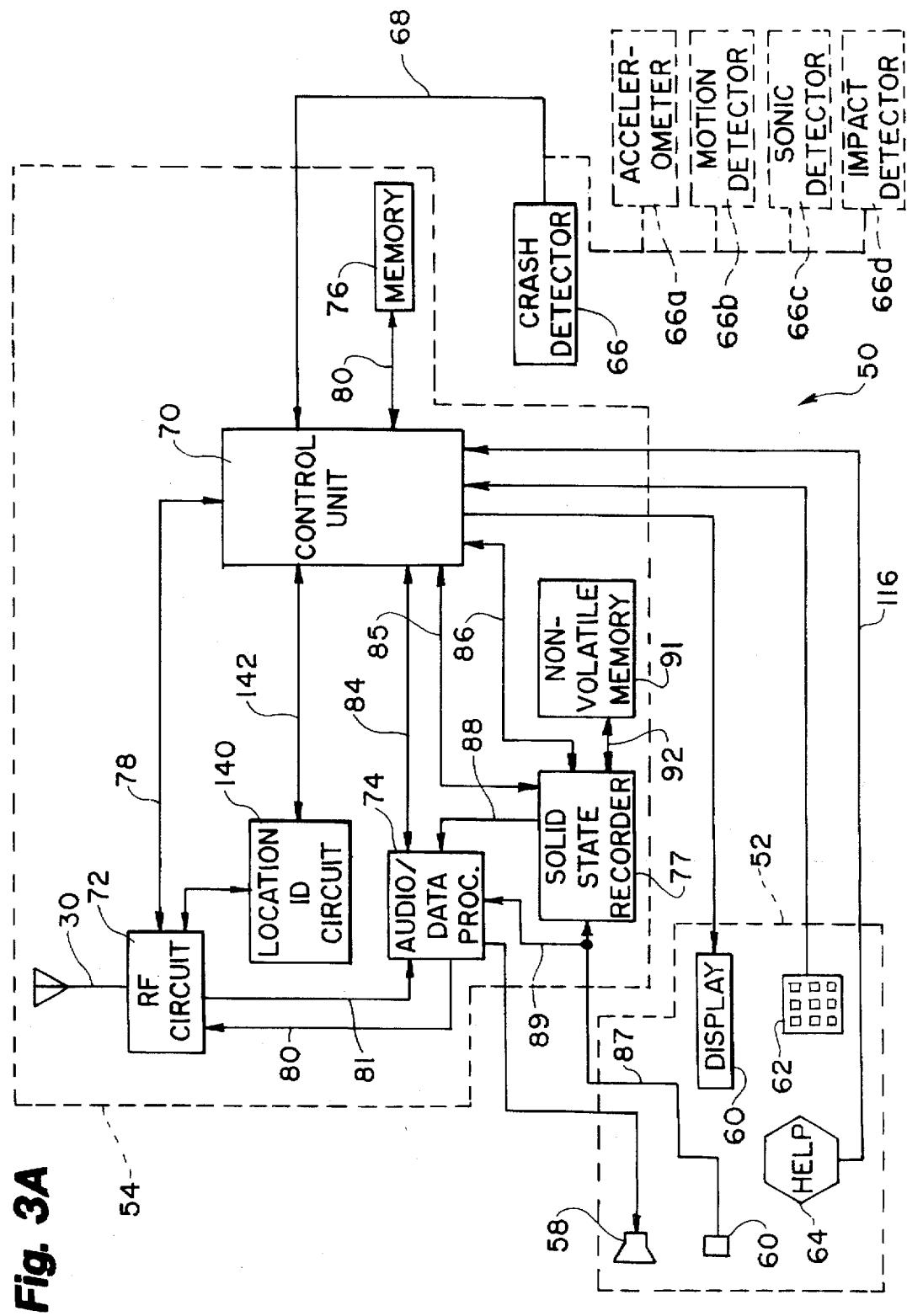

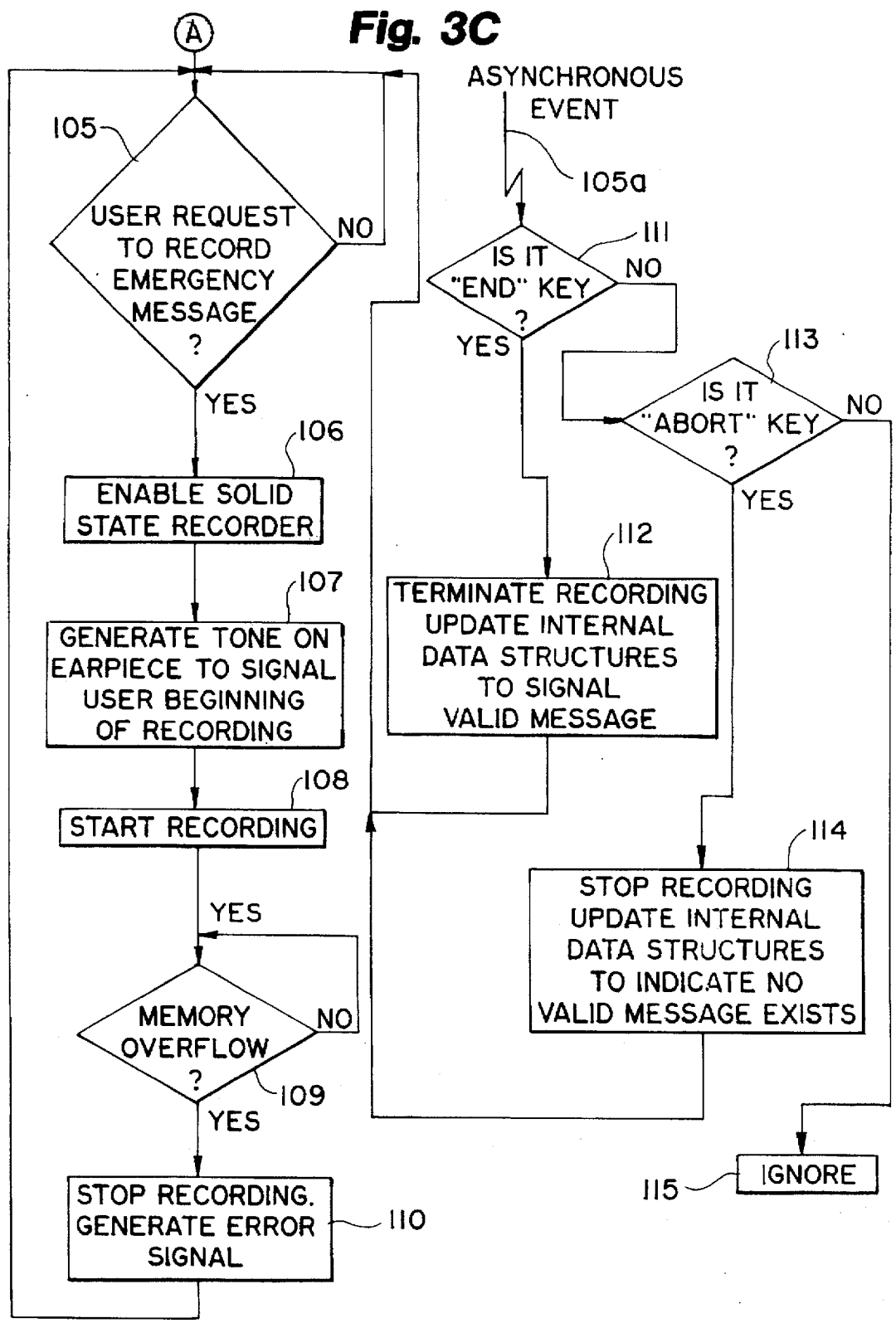

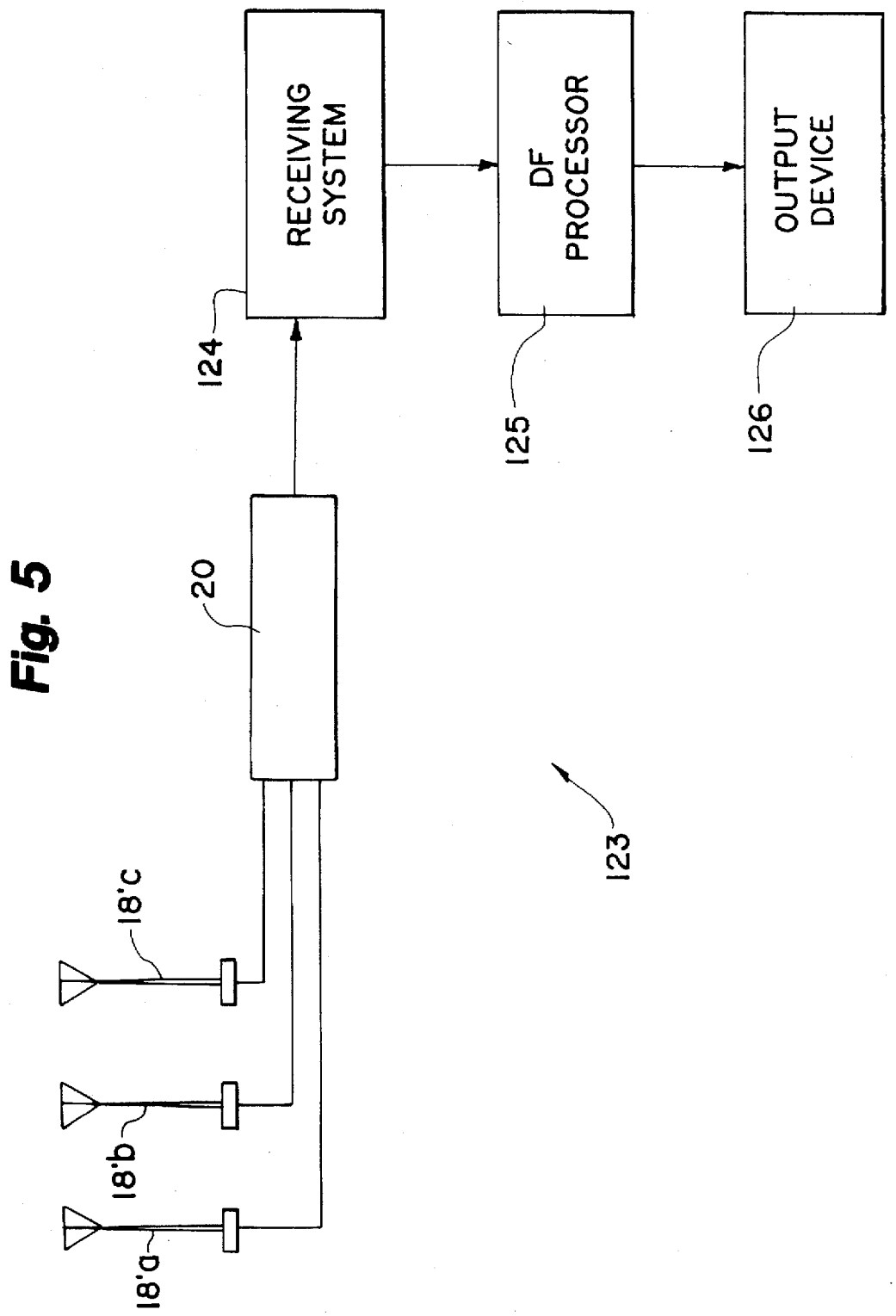

EMERGENCY MOBILE TELEPHONE

TECHNICAL FIELD OF THE INVENTION

The present invention relates generally to mobile telephone systems, and more particularly, to mobile telephone systems for us in an emergency situation. Even more particularly, the present invention relates to a cellular mobile telephone and system for automatically dialing an emergency telephone number and identifying the location of the emergency so that the proper authorities are notified.

BACKGROUND OF THE INVENTION

Cellular mobile telephone systems are known in the art. Cellular telephones for a given system operate within a predefined geographic region which is divided into several small service zones referred to as "cells." Each cell includes one or more radio transmission stations, and the transmission stations form a radio network which links the cellular telephone transceiver with the local telephone network. As a result, cellular telephone users are able to make and receive telephone calls from anywhere within the geographic region.

Cellular telephones offer increased mobility and/or accessibility to the user when making or receiving telephone calls as compared to the standard telephone network. For example, most cellular telephones are installed in an automobile, truck, van, etc. The user is able to make and to receive telephone calls, even while driving. Other cellular telephones are designed to be portable so that the user may carry and use the telephone wherever he or she travels. In any case, cellular telephones permit a user to conduct a conversation over the telephone without necessarily having access to a conventional telephone.

Unfortunately, emergencies are known to occur, and cellular telephone users are not excepted from emergency situations. As an example, a cellular telephone user driving in his or her vehicle may be involved in an accident. As another example, a cellular telephone user may suffer serious injury resulting from an accident caused by faulty equipment at a job site. Even further, a cellular telephone user might be assaulted, become seriously ill, or get lost in an unfamiliar area. In any of these situations, it is important that the cellular telephone user receive emergency help quickly.

In the past, cellular telephones were useful only to a limited degree in the event that the user was involved in some type of emergency. In instances where the cellular telephone user is fully alert and able to dial the telephone, the cellular telephone user can simply dial an emergency number on the cellular telephone and request help. The emergency number could be the number for the local police, the paramedics, 911, etc.

However, there are many situations which can arise where the cellular telephone user is unable to dial such an emergency number using the cellular telephone. For example, if the user is involved in an automobile accident, he or she may lose consciousness. Alternatively, the user may be disoriented and incoherent, and thus unable to make an emergency call. As yet another example, the cellular telephone user could be assaulted and thus be prevented from using the telephone to call for help.

Because cellular telephones in the past were not capable of dialing an emergency number automatically, in certain instances, emergency calls, especially repeat emergency calls, could not be made, and help could not be provided.

Moreover, previous cellular telephones were not capable of detecting the occurrence of an emergency, such as an automobile accident, and such cellular telephones were not capable of automatically dialing an emergency telephone number upon detecting such an emergency. Thus, cellular telephone users have been precluded in certain emergency situations from receiving help that otherwise would have been available had an emergency number been dialed automatically by the cellular telephone.

Additionally, even if the cellular telephone user were able to dial out and make a call in the event of an emergency, circumstances can arise where the user is unable to communicate with the person receiving the telephone call. Oftentimes, the cellular telephone user may be unable to explain that an emergency situation exists. For example, the user could be injured to the extent that he or she loses consciousness shortly after making the call. Alternatively, if the user is the victim of an assault, the user might be able to dial secretly; however, the user may not be able to communicate openly after the call has been made. Unless some type of emergency message is conveyed automatically by the cellular telephone, the receiving party would be unable to determine the purpose of the call or the identity or location of the caller.

Circumstances often arise where the location of the user is critical, but the user is not able to communicate his or her location in order that help may be provided. For example, the user could be lost in an unfamiliar area. Likewise, the user could be disoriented to the extent that the user does not know his or her whereabouts. Although the user may be able to dial the emergency number, the person or persons answering the call would be unable to respond because the user's location is unknown.

Previous cellular telephones and cellular telephone systems could identify only the "cell" in which the user was located. Typically, such a "cell" could cover a number of, and perhaps many, square miles. It would be extremely difficult for the authorities to conduct a blanket search of the entire area.

Accordingly, there is a strong need in the art for a cellular telephone and system which enables an emergency number to be dialed automatically without requiring that the user manually enter the number. Moreover, there is a strong need for a cellular telephone with which the user, by touching a single dedicated key on the handset, can initiate the dialing of a predetermined emergency telephone number. Even further, there is a strong need for a cellular telephone which automatically dials an emergency number upon detecting that an accident has occurred. In addition, there is a strong need in the art for a cellular telephone which transmits a prerecorded emergency message after the emergency number has been dialed, thus notifying the receiving party that the user is in distress.

Moreover, there is a strong need in the art for a cellular telephone and system which can identify the location of a user in an emergency so that help can be provided. In addition, there is a need for a cellular telephone system which can convey location information regarding the cellular telephone user to the appropriate authorities so that help can be provided. Even further, there is a strong need for a cellular telephone and system which can update the user location information during an emergency so that help can be provided even if the user is immobilized or unconscious.

Accordingly, the present invention overcomes the aforementioned shortcomings of the known cellular telephones and systems and provides an improved cellular telephone and system for making and receiving emergency telephone calls. The present invention is summarized and described in detail below.

SUMMARY OF THE INVENTION

In accordance with the present invention, there is provided a cellular mobile telephone and system wherein the cellular telephone automatically dials one or more prescribed emergency telephone numbers in the event of an emergency. Automatic dialing of an emergency telephone number is initiated by the user pressing a dedicated pushbutton on the cellular telephone handset, or alternatively, upon the occurrence of an accident which is detected by the cellular telephone.

After the cellular telephone dials the predetermined emergency number, the cellular telephone plays a recorded message which indicates that an emergency has occurred and that the cellular telephone user is in distress. Alternatively, the cellular telephone user is allowed to participate in the emergency call upon receiving notification that the cellular telephone has successfully completed the automatic dialing and a connection has been established.

In another embodiment, after the cellular telephone has dialed the prescribed emergency telephone number, the cellular telephone begins to emit a radio location identification signal. The location identification signal, along with various direction finding techniques employed within the cellular system, enable the authorities to locate the user and respond to the emergency call. During such time, the cellular telephone will maintain the emergency call connection until the authorities have responded to the call, or until the user has chosen to terminate the call.

According to one aspect of the present invention, an emergency cellular telephone for use by a cellular telephone user in a cellular telephone system is provided, such telephone including receiving means for receiving cellular radio communications within the system, transmitting means for transmitting cellular radio communications within the system, and automatic dialing means for dialing a prescribed emergency telephone number in response to a prescribed input.

According to another aspect of the invention, there is provided an emergency mobile cellular telephone system within which a cellular telephone user having a cellular telephone can make and receive telephone calls, such system including means for making and receiving cellular telephone calls using the cellular telephone, means for identifying the location of the cellular telephone user, and output means for communicating said location information.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings:

FIG. 3A is a block diagram of the cellular telephone of FIG. 2 in accordance with the present invention;

FIG. 3C is a flow chart showing the cellular telephone system logic for recording and storing an emergency message in accordance with the present invention;

FIG. 5 is a block diagram of the location identification section of the cellular mobile telephone system in accordance with the present invention;

DETAILED DESCRIPTION OF A PREFERRED EMBODIMENT

Figure 1:
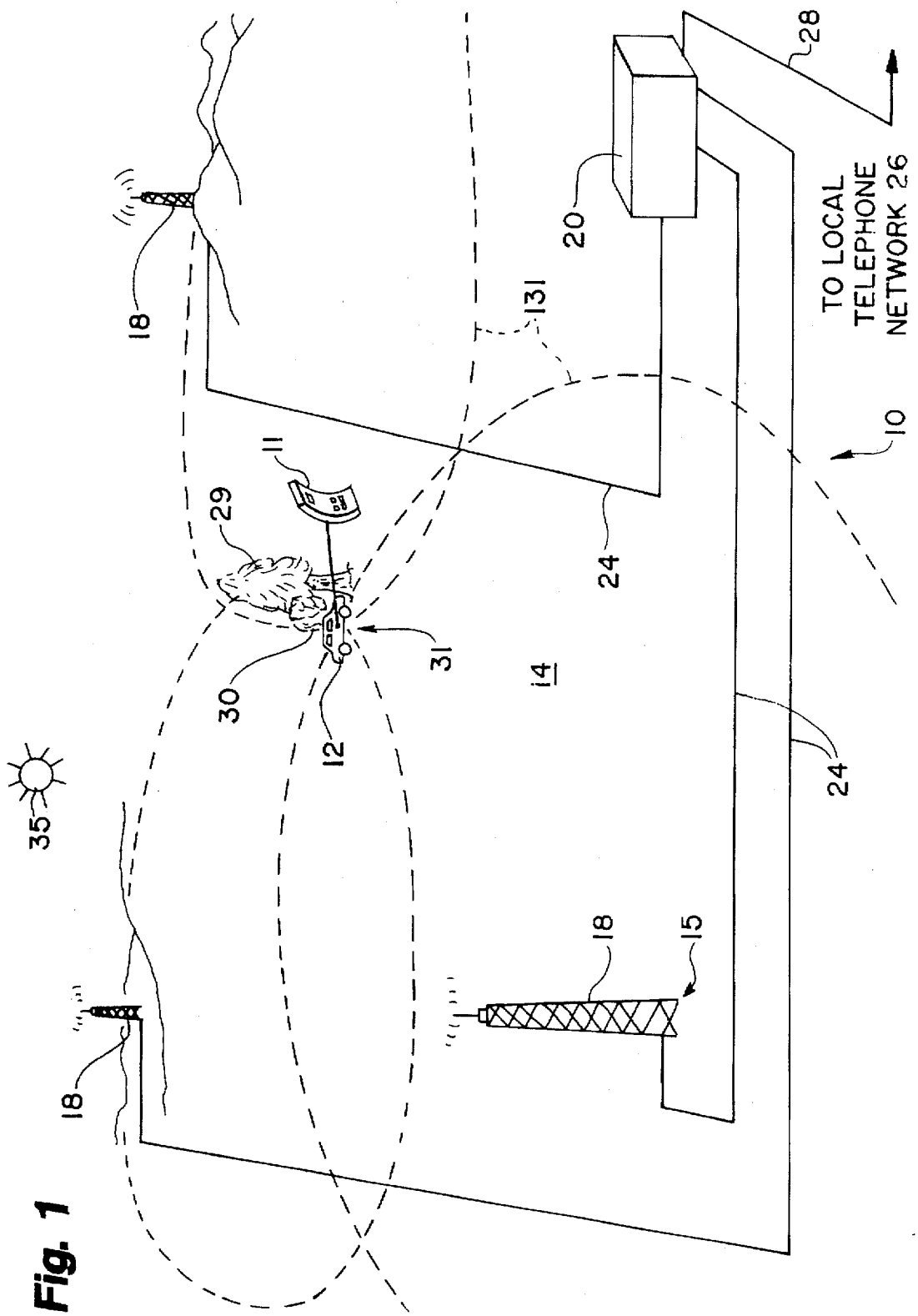
FIG. 1 is a schematic diagram of an emergency cellular mobile telephone system in accordance with the present invention.

Referring now to the drawings, wherein like numerals are used to refer to like elements throughout, an emergency cellular mobile telephone system 10 in accordance with the present invention is shown in FIG. 1. The cellular mobile telephone system 10 includes a cellular telephone 11 (schematically shown) which typically, although not necessarily, is installed in an automobile 12, truck, boat, etc. Alternatively, the cellular telephone 11 is a portable device which is hand carded by the user.

The cellular telephone system 10 of the present invention operates over a predefined geographic region 14. The geographic region 14 is divided into several small service zones referred to as "cells." As the cellular telephone 11 user in automobile 12 moves about within the geographic region 14 and through the cellular telephone system 10, the user remains in radio contact with the local telephone network. Thus, as the user travels about the region 14, the user can place a telephone call to the local telephone network without necessarily having access to a standard telephone.

Each cell in the region 14 has one or more rf transmission stations 18 which function to transmit and receive cellular information between the cellular telephone 11 user and the local telephone network. As is conventional, the user is always in radio contact with at least one of the rf transmission stations 18. Typically, the rf transmission station 18 which is located nearest the cellular telephone 11 user is utilized to maintain the radio contact with the cellular telephone. As the user moves to another location, control of the radio link is handed off to the next rf transmission station 18 along the way, as is known.

Each rf transmission station 18 in the cellular telephone system 10 is connected to a central control station 20 for the system 10 by way of a trunk 24. At the central control station 20, the necessary switching operations are performed to hand off control of the cellular communications with the cellular telephone 11, as is known. The central control station 20 is connected into the local telephone network 26 by trunk 28, thus providing the cellular telephone user with access to the local telephone network.

As is illustrated, the cellular telephone user in the automobile 12 may be involved in an emergency which involves, for example, hitting tree 29. In the event of such an emergency, the user becomes what is referred to herein as a "user in distress." The present invention provides a cellular telephone which will automatically dial a preprogrammed emergency telephone number in case of such an emergency. The automatic dialing is initiated either by the user (if the user is conscious), or by the cellular telephone itself using some type of crash detector. After the connection has been completed, a prerecorded emergency message requesting assistance is communicated over the telephone line to the party at the receiving end of the call. The cellular telephone also allows the user to interrupt the transmission of the prerecorded emergency message so that the user may provide his or her own message.

In addition, the cellular telephone system 10 and cellular telephone 11 of the present invention engage in one or more of a variety of direction finding techniques which permit the system 10 to identify the precise location of the user in distress. After the location is determined, the location information is automatically communicated to the receiving party so that assistance may be dispatched promptly. If the preprogrammed emergency number is the telephone number of the police or sheriff's department, information on the location of the user is received directly, and help can be provided. Alternatively, the emergency telephone number can be a dedicated telephone number within the system 10. A central dispatcher at the central control station 20 receives the emergency call, records the relevant location information, and dispatches help by way of the appropriate authorities.

In one embodiment of the invention, the cellular telephone 11 causes the antenna 30 on the automobile 12 to emit a distress signal in the event of an emergency. The distress signal is of sufficient power to be received by two or more of the surrounding rf transmission stations 18. Because the rf transmission stations 18 function as individual elements in an antenna array, the central control station 20 applies known direction finding techniques, such as triangulation, to process the signals received from the rf transmission stations 18 in order to determine the precise location 31 of the user in distress. After the location is identified, the central control station 20 further processes the distress and location information so that the proper (and preferably the closest) authorities are notified and assistance is provided to the user, e.g., in the location of the tree 29.

In an alternate embodiment of the present invention, the cellular telephone 11 in the automobile 12 includes an on board location identification system. The location identification system employs a navigation system or the like to determine the location of the user in distress. After the cellular telephone determines the specific location, the telephone automatically dials the preprogrammed emergency telephone number and communicates the location information to the receiving party. An example of an on board location identification system which can be used in the present invention is a global positioning system such as the GPS System sold by Rockwell International. The global positioning system employs a land-based unit in the cellular telephone which operates in conjunction with a satellite 35 to determine the exact location coordinates of the user in distress. The location coordinates are then transmitted over the cellular telephone line to the party whose emergency telephone number has been automatically dialed.

Figure 2:
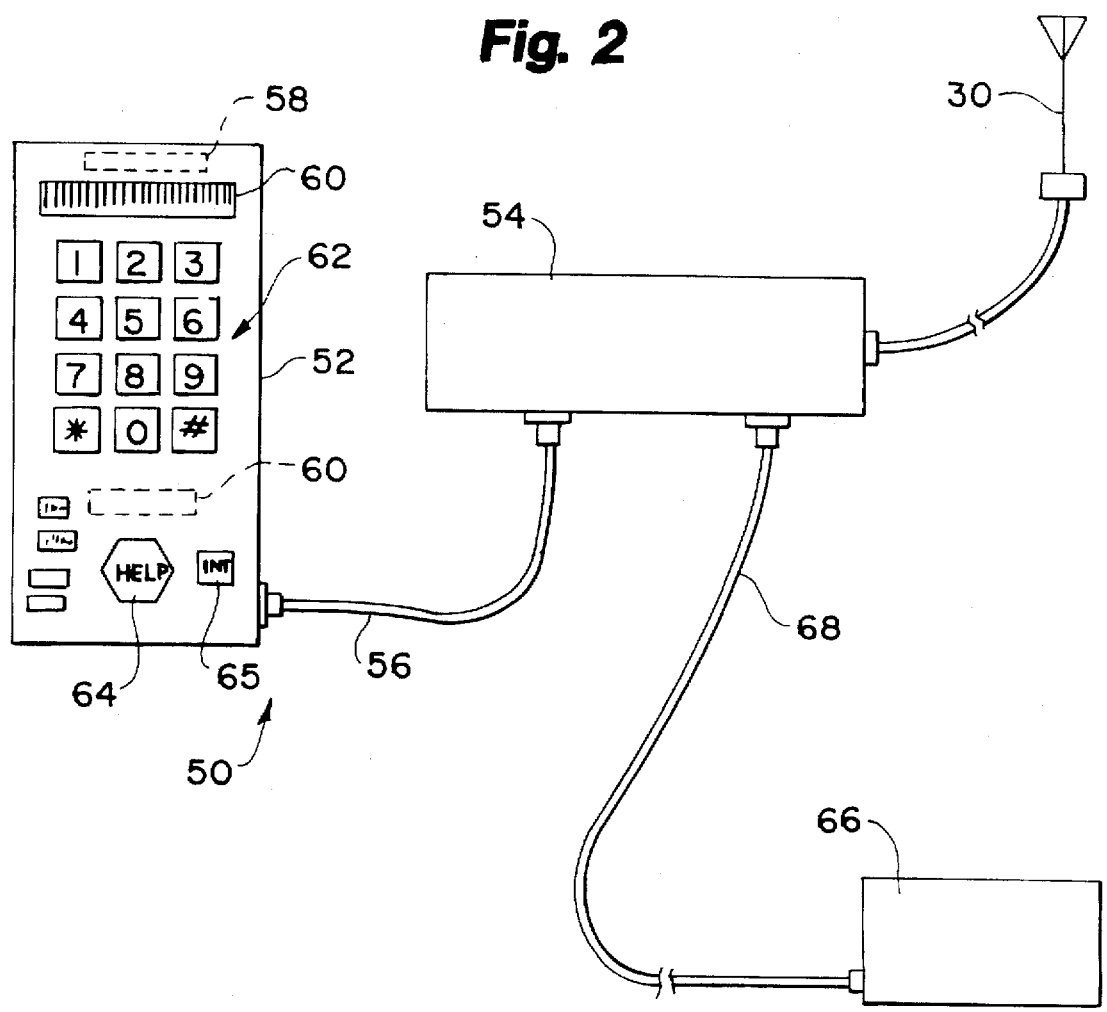
FIG. 2 is a schematic diagram of a cellular telephone in accordance with the present invention used in the system of FIG. 1.

Referring now to FIG. 2, a cellular telephone 50 (designated 11 in FIG. 1) in accordance with the present invention is shown. The cellular telephone 50 includes a handset 52 and transceiver 54. The handset and transceiver are joined by an electrical 30 cable 56. As is common in the industry, the handset 52 includes an earpiece 58 and microphone 60, shown in phantom in FIG. 2 as being on the opposite face of the handset 52. The handset 52 further includes a display 60 and keypad 62.

To make a call under ordinary conditions, the cellular telephone user enters the number of the party to be called by pressing the appropriate sequence of digit and/or function keys on the keypad 62. The handset 52 sends a series of control signals to the transceiver 54 and, as a result, the transceiver 54 establishes a two-way cellular communication link with the appropriate rf transmission station 18 through antenna 30.

Incoming telephone calls to the cellular telephone 50 are received at the antenna 30 and transceiver 54. The transceiver 54 decodes the radio signal, and the audio signal is provided to the handset 52 using conventional techniques.

In accordance with the preferred embodiment of the present invention, the cellular telephone 50 includes an emergency key 64 which, when depressed, causes the cellular telephone to dial automatically an emergency telephone number which is preprogrammed and stored in memory in the cellular telephone. Thus, when the cellular telephone user is in distress, the user can simply press a single key to initiate an emergency call. The preprogrammed telephone number could be that of the police, an emergency 911 service, an emergency service provided by the cellular telephone system 10, a family member, etc.

When the emergency call is dialed and connected through the transceiver 54, a prerecorded message which is digitally or otherwise stored in the memory of the cellular telephone 50 is communicated over the cellular telephone link to the receiving party. The user can interrupt the prerecorded message and provide his or her own message by pressing a predetermined interrupt code. Such a code can be a single function key or a sequence of keys. The sequence may consist of one or more digit keys and/or the "#" or "*" keys. Alternatively, the interrupt code can be provided by a single dedicated interrupt key 65.

Moreover, while the emergency key 64 is described in the preferred embodiment as being a single dedicated key, it will be apparent to those having ordinary skill in the art that the same function may be obtained using a unique sequence of depressed keys on the keypad. However, it is desirable that the user be able to initiate the automatic dialing of the emergency telephone number without having to dial more than a few digits. Otherwise, the utility of the present invention is compromised.

In the event the cellular telephone is installed in an automobile 12 or other type of vehicle, the cellular telephone preferably includes a crash detector 66. The crash detector 66, upon detecting that an accident has occurred, sends an electrical control signal along cable 68 to the transceiver 54 instructing the cellular telephone 50 to dial automatically the emergency telephone number as if the emergency key 64 has been depressed. The crash detector 66 may include an impact sensor 66d (shown in FIG. 3A) such as an accelerometer 66a (shown in FIG. 3A), a sonic sensor 66c (shown in FIG. 3A) designed to detect breaking glass, a mechanical sensor 66d (shown in FIG. 3A) on the front and/or rear bumper of the vehicle, motion detector 66b (shown in FIG. 3A) etc. A variety of mechanisms for use as a crash detector 66 will be apparent to those having ordinary skill in the art in view of the present disclosure and are within the intended scope of the present invention.

The transceiver 54, as is shown in FIG. 3A, includes a cellular telephone control unit 70 which serves as the primary controller for the circuitry in the cellular telephone 50. In addition, the transceiver 54 includes an rf circuit 72 and the antenna 30 which combine to form the above-described radio link between the cellular telephone 50 and the respective rf transmission station 18. The transceiver 54 also includes an audio and data signal processor 74 for performing the necessary processing of the audio and digital signals between the control unit 70, rf circuit 72 and the handset 52. In addition, the transceiver 54 includes memory 76 for storing data as well as the system program, also referred to herein as the software program, for the control unit 70 central processing unit.

The memory 76 also is used for storing the preprogrammed emergency telephone number. The emergency telephone number can be that of the police, the sheriff's department, 911, a dedicated emergency service number offered by the cellular telephone system 10, or the like. A solid-state recorder 77 is used to record and to play back a digitized emergency message. The message can be a brief explanation, such as, "My name is Pamela, I am a cellular telephone user who is involved presently in an emergency. I am in need of assistance, please send help. Information as to my location will follow at the end of this message."

In the preferred embodiment, the control unit 70 is a microcontroller which includes a central processing unit, an analog-to-digital (A/D) converter, a bi-directional I/O port and a pulse width modulation output. The central processing unit within the control unit 70 is programmable and may be programmed to perform all of the functions described herein, as will be apparent to those having ordinary skill. An example of a suitable control unit 70 is the commercially available S80C552 8-bit microcontroller manufactured by the Signetics Corp.

The control unit 70 is connected to the rf circuit 72 by a bi-directional serial data and control line 78. The rf circuit 72 includes a receiver subsystem and transmitter subsystem (not shown), and the signal on line 80 from the audio and data processor 74 serves to modulate the transmitter subsystem. Line 81 connects the demodulated audio and control data signal from the rf circuit 72 receiver subsystem to the audio and data processor 74 which is coupled to the control unit 70 by way of a bi-directional data and control line 84. An exemplary audio and data processor 74 which can be used in accordance with the present invention includes the commercially available UMA1000 data processor manufactured and sold by the Signetics Corp. In addition, audio processors NE/SA5751 and NE/SA5750, also available from the Signetics Corp., are combined to form the audio and data processor 74.

The control unit 70 is coupled to the solid-state recorder 77 by way of bi-directional serial data line 85 and control line 86. The solid-state recorder 77 receives and digitally records an analog signal via line 87 from the microphone 60. The outputs of the microphone 60 and the solid-state recorder 77 are coupled to the audio and data processor 74 by way of lines 88 and 89, respectively. Therefore, both conventional audio from the microphone 60 and a prerecorded audio message from the solid-state recorder 77 can be selectively input by the controller unit 70 to the audio and data processor 74. The audio is then provided along the modulation line 80. The prerecorded message from the solid-state recorder is stored in memory 91 via line 92.

The commercially available MSM6388 solid-state recorder from Oki Data is used in the preferred embodiment, although it will be appreciated that numerous other recorders will function equally as well. Moreover, although the MSM6388 is preferred due to its reduced bandwidth, standard A/D and D/A converters built into the control unit 70 and the audio and data processor 74 can be used as the solid-state recorder 77. However, it may be necessary to use a faster serial data bus or a parallel bus in order to transmit a digitized voice message, as will be appreciated.

When the user wants to program a new emergency telephone number and/or emergency message into the cellular telephone 50, the user first sets the control unit 70 in the program mode by pressing the appropriate keys on the keypad 62. The key can be a dedicated function key (not shown), or a predefined sequence of keys which the control unit 70 recognizes as an instruction to enter the program mode.

Figure 3B:
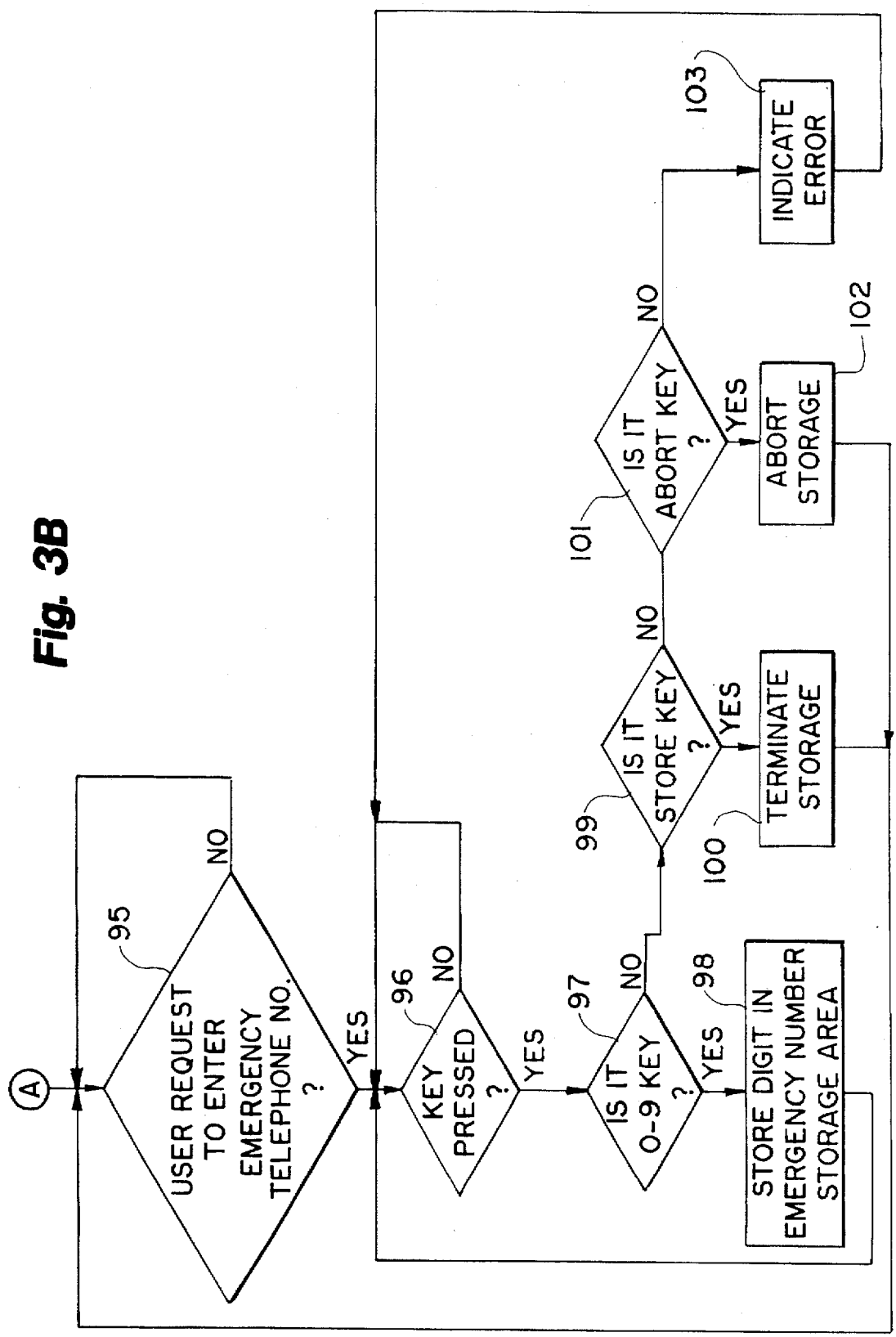
FIG. 3B is a flow chart showing the cellular telephone system logic for storing an emergency telephone number in accordance with the present invention.

Referring now to FIG. 3B, a computer program flow chart representing the system logic for storing an emergency telephone number is shown. It will be appreciated that an appropriate computer program or series of steps or commands could be written by a person who has ordinary skill in the art, such as a computer programmer, to cause the circuitry and other components of the cellular telephone 50 to carry out the steps represented in the flow chart of FIG. 3B and in the other flow charts presented herein. Such computer program is referred to herein as the system program of the software program which may be stored in memory 76, as is referred to above. Except as otherwise represented by the flow charts and description provided herein, the system program operates in a conventional manner to carry out the normal functions provided by existing cellular telephones.

Initially, the telephone is in a standby mode A which preferably is entered automatically when the telephone receives power. In step 95, the user will request to record an emergency telephone number by pressing a predefined key sequence (or a dedicated key) on the cellular telephone keypad. Upon receiving this request, the software program running on the cellular telephone's control unit 70 will determine if a valid digit 0-9 has been pressed, as is illustrated in steps 96 and 97. If a "valid" digit is pressed, the control unit 70 will store the digit along with subsequent "valid" key entries in the emergency telephone number storage area in the system's non-volatile memory 76, as is shown in step 98.

If the user presses the terminate key (this can be, for example, the STO key or any other predefined key sequence in step 99), the software program stops storing the telephone number, as is shown in step 100, and returns to step 95 before the user request to enter the emergency number is received.

If, in step 101, the user presses the abort key (that can be the CLR key or any other predefined key sequence, for example), the control unit 70 software program abandons storing the telephone number, as is shown in step 102, and returns to step 95 before the user request to enter the emergency number is received. If any other key is pressed, an error condition is indicated, as is illustrated in step .103, and the entry is ignored. The error can be indicated via an audible, visible, or an audible and visible signal from the handset display 60 and earpiece 58, for example.

FIG. 3C illustrates the system logic for recording an emergency message in accordance with one embodiment of the present invention. Again, the telephone is preferably in a standby mode A which occurs when power is applied to the telephone. In step 105, the user will request to record an emergency message by pressing a predefined key sequence (or a dedicated key) on the cellular telephone keypad. Upon receiving this request, the software program running on the cellular telephone control unit 70 will enable recording, as is shown in step 106. In the preferred embodiment, the software program causes the control unit 70 to enable the solid-state recorder 77 by way of the control line 86.

In step 107, the software program generates a tone on the earpiece 58 to signal the user to start speaking into the microphone 60. This signal can be an audible, visible, or an audible and visible signal.

During recording in step 108, the user speaks into the microphone 60, and the audio signal on line 87 is input into the solid-state recorder 77, as is illustrated in FIG. 3A. The message is digitized and stored by the recorder 77, and the software program monitors the memory usage. If a memory overflow condition occurs in step 109, the program terminates recording by causing the control unit 70 to disable the solid-state recorder 77 in step 110. The program also notifies the user of the error condition by generating an error signal on the display, for example. If the user presses a key on the keypad 62 during recording causing the "asynchronous event" shown in FIG. 3C, the software program is interrupted. The asynchronous event causes the flow chart of FIG. 3C to be entered at line 105a following to block or step 111. For example, the software program responds to keys as follows:

A. If the terminate recording key is pressed in step 111 (this can be, for example, the END key used to terminate telephone connections, or it can be any predefined key sequence), the software program terminates recording by turning off the solid-state recorder 77, as is shown in step 112, and updates the internal data structures to reflect that a valid emergency message exists in memory. The program then returns to the original state in step 105.

B. If the abort recording key is pressed in step 113 (this can be the CLR key or any other predefined key combination), the software program terminates recording by turning off the solid-state recorder 77 and updates the internal data structures in step 114 to reflect that a valid emergency message does not exist in memory. The software program then returns to step 105.

C. If any other key or key sequence is pressed, the entry is ignored, as is illustrated in step 115, and the software program continues recording.

The software program for the control unit 70 provides that when a user in distress depresses the emergency key 64, a control signal on line 116 causes the control unit 70 to access the emergency telephone number which had been stored previously in memory 76. The control unit 70 proceeds to retrieve the emergency number from memory 76 and goes through the same steps required to dial the telephone number as are otherwise taken when the user enters a telephone number and presses the SEND button to initiate a call.

Figure 4:
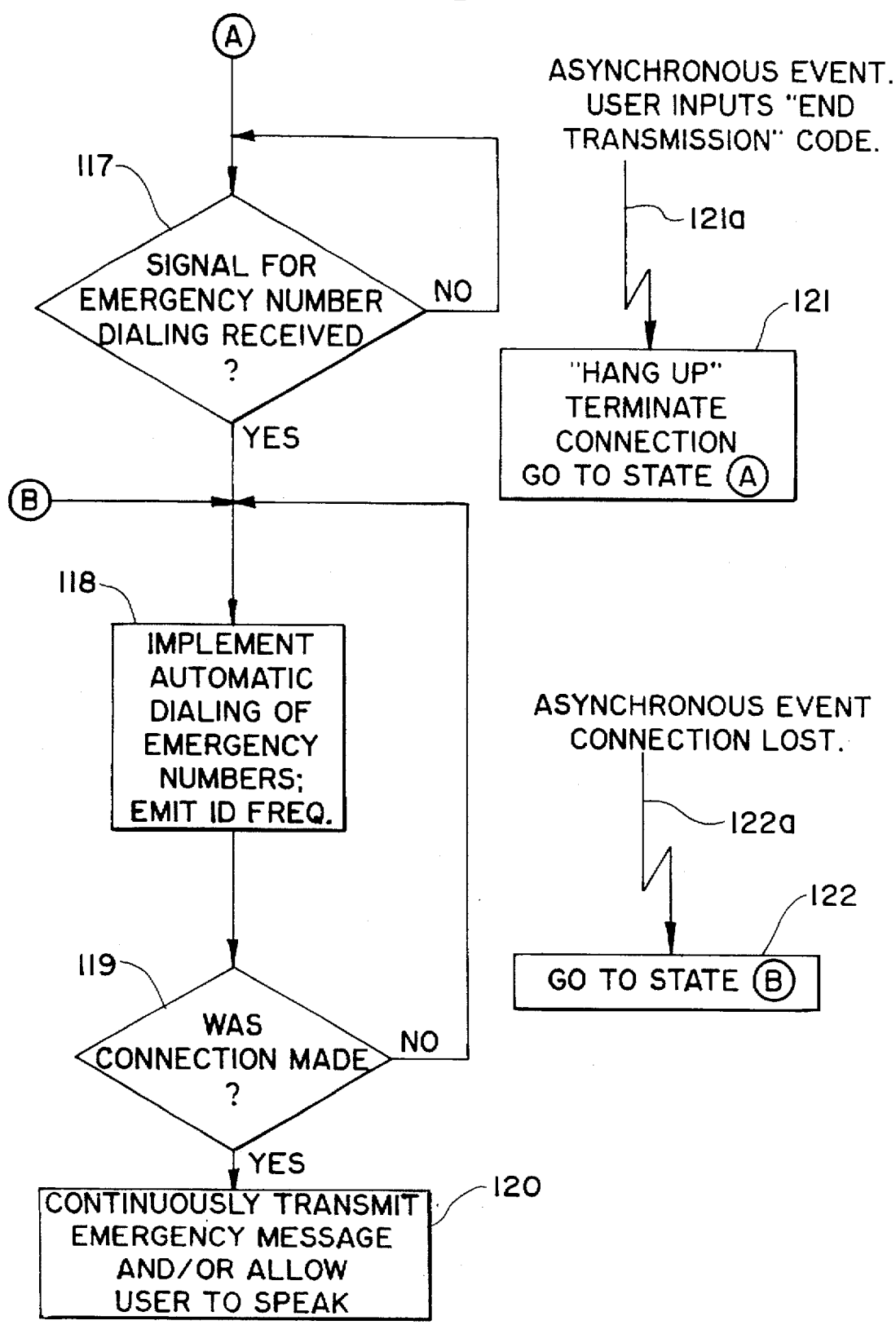
FIG. 4 is a flow chart showing the cellular telephone system logic for automatically dialing an emergency telephone number in accordance with the present invention.

A flow chart of the cellular telephone 50 system logic for automatically dialing the emergency telephone number is shown in FIG. 4. Under ordinary circumstances, the cellular telephone 50 exists in the standby mode of state A where the telephone is fully operational as a cellular telephone for use in a conventional manner. As is shown in step 117, the cellular telephone control unit 70 constantly monitors its inputs to determine whether a signal requesting that the emergency telephone number be automatically dialed has been received. Such signal can come from the emergency key 64 being depressed or, for example, from the crash detector 66 upon the detection of a crash.

If a signal indicating an emergency dialing request is received, the control unit 70 proceeds to step 118 where the cellular telephone 50 implements the automatic dialing procedure. The emergency telephone number is retrieved from memory and dialed in the manner described above. After the call has been dialed, the control unit 70 determines whether a connection was made, as is shown in step 119. If the connection with the receiving party was made, the control unit 70 in step 120 causes the solid-state recorder 77 via control line 86 to retrieve the stored emergency message from memory 76 and to replay the message continuously over the voice channel to the receiving party.

Specifically, the digitized emergency message is reconverted into an analog signal using a D/A converter, preferably in the solid-state recorder 77 or in the audio and data processor 74. The analog emergency message signal is provided to the audio and data processor 74 along line 88 and is modulated onto the rf carrier through the rf circuit 72 by way of line 80. The emergency message is thereby transmitted to the receiving party so as to notify the party that the user is in distress. If, in step 119, the connection is not made, the control unit 70 of the cellular telephone 50 will return to step 118 and repeat the automatic dialing procedure.

While the cellular telephone 50 is in step 120, the user in distress has the option of interrupting the playing of the emergency message and instead talking with the receiving party. If the user is conscious, he or she may be able to describe the emergency and/or to communicate his or her location so that help can be provided. In order to interrupt the emergency message, the user simply depresses the appropriate key or sequence of keys on the handset 52 as described above. A sequence detector programmed into the control unit 70 will detect the interrupt sequence and allow the user to override the transmission of the emergency message by speaking into the microphone 60.

Alternatively, in step 121, the user may want to terminate the emergency dialing/message. The user simply depresses a dedicated function key or sequence of keys, resulting in an asynchronous event represented by line 121a which causes the control unit 70 in the cellular telephone 50 to return to state A. In the event the connection is lost between the cellular telephone 50 and the receiving party, as represented by line 122a, in step 122 the control unit 70 detects such an occurrence and returns to state B in the system program.

In the preferred embodiment, the cellular telephone 50 emits a location identification signal in addition to a prerecorded message in the event of an emergency. The location identification signal allows the cellular telephone system 10 to employ direction finding techniques such as triangulation to locate the user in distress.

Accordingly, in step 118 the cellular telephone 50 will simultaneously begin to emit a location identification signal after detecting the signal to dial the emergency number. The control unit 70 in the cellular telephone 50 causes the rf circuit 72 to begin transmitting a high-frequency signal which can be detected by two or more antennas at the surrounding rf transmission stations 18. Based on the relative amplitude and/or phase of the location identification signal as it is received at the rf transmission stations 18, the cellular system 10 is able to determine the location of the user using a location identification as is described below.

As will be appreciated by those familiar with the art, the location identification signal preferably is transmitted from the cellular telephone 50 at an increased power level as compared to ordinary cellular communications. The increased power level will result in the signal reaching a greater number of rf transmission stations 18. Furthermore, the increased signal strength will provide even better resolution in locating the user in distress based on reduced signal degradation.

A block diagram of the cellular telephone location identification system 123 is shown in FIG. 5. The location identification system 123 is part of the cellular telephone system 10, and antennas 18'a–18'c represent the respective antennas' elements at three of the surrounding rf transmission stations 18. Preferably, these three antennas 18'a–18'c represent the antennas to which received signal strength of the location identification signal is greatest. Typically, this will be the antennas which are nearest the point where the user in distress is located. However, it is not necessary that the respective antennas be the nearest. It is only necessary that the antennas be properly positioned and receive a signal of sufficient strength to employ direction finding techniques such as triangulation.

Each antenna element 18' functions as an element in an antenna array which enables the system 123 to locate the user using one or more known direction finding techniques. While it is preferred that the system 123 use three antennas in the array, it will be apparent that two or more antennas will provide the necessary location information. Moreover, each particular antenna element 18' can consist of either a single antenna or a plurality of antennas in a sub-array as will be apparent to those skilled in the art. Furthermore, the antenna elements 18' can be comprised of the same antennas which are used at the rf transmission station 18 for ordinary cellular communications. Alternatively, the antenna elements 18' may be separate, dedicated antennas used predominantly in locating the user in distress. In addition, while the location system 123 is described as having the antenna elements 18' positioned at the same location as the rf transmission station 18, it will be apparent that the antenna elements 18' and the antenna array formed therefrom can consist of antennas positioned in alternate locations within the region 14.

When an emergency occurs and the cellular telephone 50 begins to emit the location identification signal, the central control station 20 receives the location identification signal from the antennas 18' along trunks 24. At the central control station 20, the respective signal received from each antenna is evaluated relative to the others in order to determine the location of the user. The receiving system 124 measures the response of the various antennas 18' (also referred to below as elements or antenna elements) to the location identification signal emitted from the user in distress. The direction finding processor 125 performs the necessary signal processing requirements to derive the location information from the output of the receiving system. Afterwards, the location information is sent to the output device. The location information can consist of the coordinates of the user in distress so that help can be provided. The cellular region 14 is subdivided into a grid array, and the location coordinates pinpoint the exact location of the user in distress. The output device 126 routes the location information along the telephone network to the proper authorities or, more specifically, to the party whose number is the emergency telephone number programmed in the cellular telephone.

The location information received by the responding party can be in the form of the above-mentioned grid coordinates which are digitally communicated over the telephone line. Alternatively, a voice synthesizer within the output device 126 is utilized to provide a voice description of the user's location based on such coordinates. In addition, the location coordinates can be further processed within the output device 126 in order to provide street information, if available, regarding the location of the user. This is accomplished by a digitized map overlay which, in conjunction with the known coordinates, provides useful street information. Many various approaches for conveying the location information to the receiving party will be apparent in view of the present disclosure and are considered included in the invention. Accordingly, the scope of the present invention is not intended to be limited to the examples provided herein.

The specific technique of direction finding employed by the system 123 can include one or more of several techniques known in the field of direction finding. A known technique commonly utilized in the defense industry involves what is referred to as triangulation. Basically, such a system 123 employing triangulation techniques can be a scalar based system in which the location of the user in distress is determined from the amplitude or phase response from the antenna elements 18'. Alternatively, the system can be a vector based system in which both the amplitude and phase of the signals received at the elements 18' are processed in the receiving system 124 and DF processor 125 to determine the location of the user in distress.

Figure 6A:
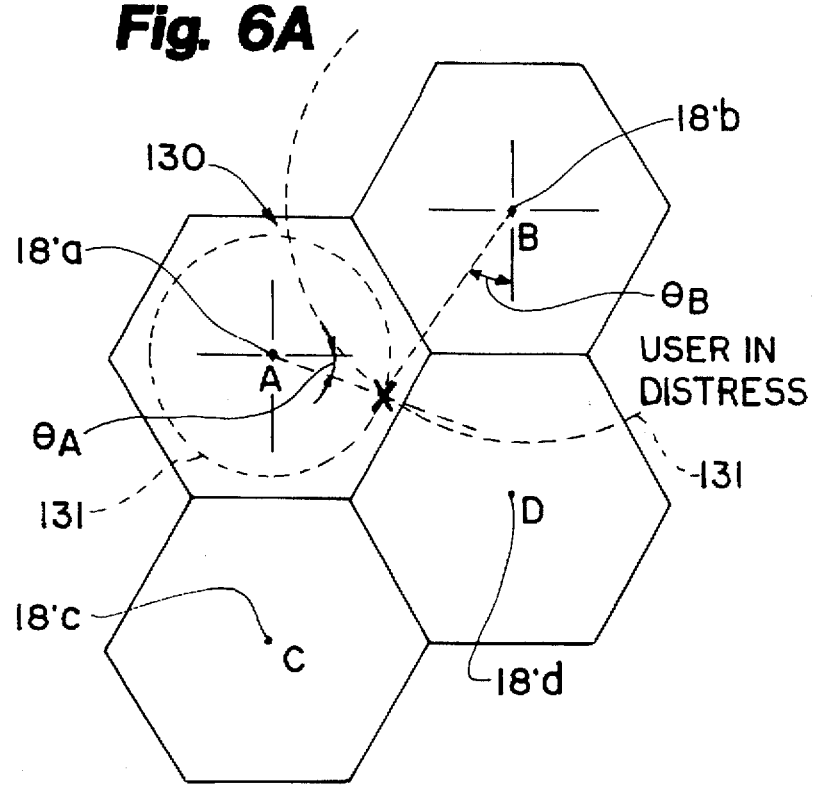
FIGS. 6A and 6B are schematic diagrams showing two and three element arrays which are used in connection with one embodiment of the location identification section of FIG. 5.

Referring now to FIG. 6A, a two-element embodiment of a triangulation-type location identification system 123 is shown. Each antenna element 18'a and 18'b is a single port antenna, and the antenna elements are electrically rotated within the direction finding processor 125 so that the azimuth angles $\Theta_A$ and $\Theta_B$ can be determined based on the amplitude and/or phase of the signal received from the respective elements. By using known principles of triangulation, the location of the user in distress may be determined.

An alternative to electrically rotating the respective elements 18' would be to use an element array 18' which actually encompasses two-elements in close relation with one another. Therefore, the position of the respective elements can be mechanically rotated and the respective azimuths $\Theta_A$ and $\Theta_B$ are determined. After $\Theta_A$ and $\Theta_B$ are determined, the direction finding processor calculates the location of the user in distress based on triangulation principles.

Figure 6B:
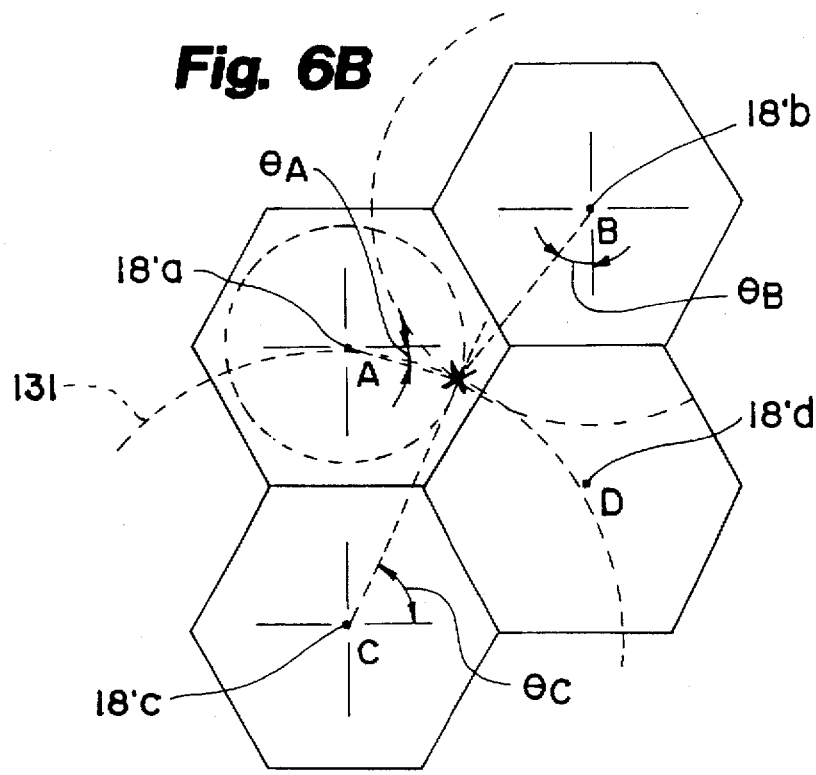

However, there can be some degree of ambiguity as to the location of the user when using a two-element scalar system such as that shown in FIG. 6A. As is know, an ambiguity can occur where location 130 appears to be an alternative location for the unit in distress. The circular lines 131 drawn about the elements 18'a and 18'b represent the respective received signal strength and/or phase of the location identification signal at each element. The ambiguity results from the elements 18'a and 18'b being rotated electrically 180°. While several methods are possible for resolving the ambiguity in order to determine the exact location of the unit in distress, the preferred embodiment of the present invention utilizes a three-element scalar system such as that which is shown in FIG. 6B.

The three-element embodiment avoids the 180° ambiguity found in the two-element system. In the three-element system, the three antenna elements are electrically rotated by the direction finding processor 125, as described above. Again, the azimuth angles $\Theta_A$ and $\Theta_B$ are determined in the direction finding processor 125 and triangulation principles are applied to identify the location of the user in distress. The location is converted to grid coordinates and is provided through the output device 126 to the receiving party.

Figure 7:
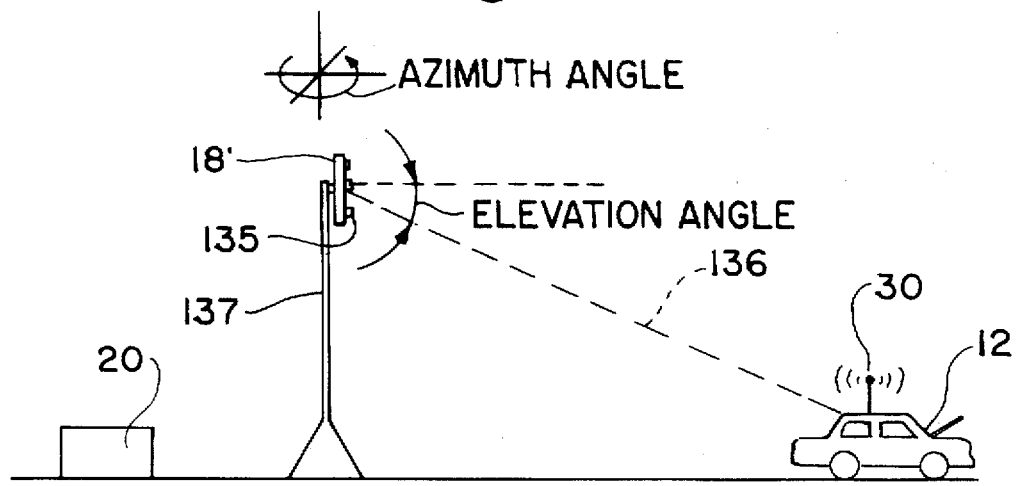
FIG. 7 is a schematic drawing of an alternate embodiment of an element array for use in the location identification section of FIG. 5.

In a different embodiment of the location identification system 123, the antenna elements 18' are, in fact, a small antenna array with a multiport output. For example, shown in FIG. 7 is a single element 18' which includes a phased array of sub-elements 135. The azimuth and elevation of the unit in distress is determined by measuring the phase difference of the signals at the output ports of the sub-elements 135 using known techniques. The known azimuth and elevation angles describe a vector 136 which points to the precise location of the user in distress. Again, the receiving system 124 and direction finding processor 125 perform such operation and provide the location information to the output device as described above.

Still another suitable embodiment of the location identification system 123 involves the element 18' of FIG. 7 being pivotably mounted to the tower 137. As a result, the element 18' can be moved in precise fashion in both the azimuth and elevation directions. Based on the amplitude and/or phase of the response from each of the sub-elements 135, the antenna element 18' is able to determine the azimuth and elevation angles. Therefore, the location of the user in distress is again calculated based on the vector 136. Such a pivotably mounted, multiport array which is suitable for use in the present invention is commonly used with a monopulse comparator system, as will be appreciated by those having ordinary skill in the field of direction finding.

Any one or more of the above-described direction finding techniques and/or antenna arrays can be used for determining the location of the user in distress within the region 14. In addition, it will be apparent that other variations are possible for use as part of the location identification system. Without going into an exhaustive recitation of the variety of direction finding techniques available, it should be appreciated that all are intended to be within the scope of the present invention as a part of an emergency mobile telephone system. Although some direction finding techniques are more subject than others to direct line-of-sight requirements between the cellular telephone antenna 30 and the system 123 antennas, it will be appreciated that one or more direction finding techniques will work in most environments. Therefore, although tall buildings, trees, etc may complicate processing in the direction finding processor 125, they certainly will not prevent identifying the location of the user in distress.

Figure 8:
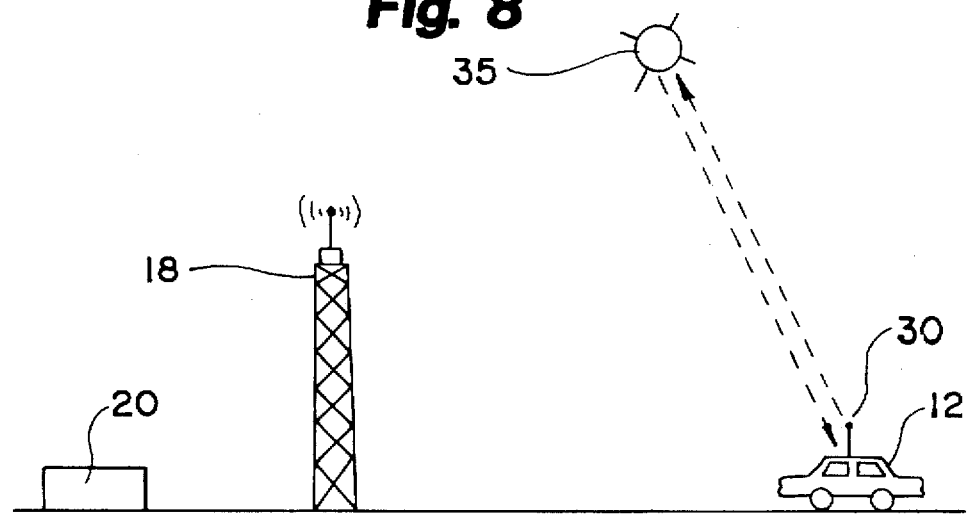
FIG. 8 is a schematic drawing of an alternate mobile based embodiment of the location identification section of the cellular telephone system in accordance with the present invention.

One notable variation of the location system for the present invention is shown in FIG. 8. In the above-described embodiments, the cellular telephone 50 serves primarily in a passive role in the location identification system. The cellular telephone 50 simply emits a distress signal which is then received and processed at the central control station 20 using the system 123. Alternatively, in the embodiment shown in FIG. 8 the cellular telephone 50 plays an active role in determining the location of the user in distress. In this particular embodiment, the cellular telephone 50 employs an internal navigation system, or portion thereof, which is capable of determining the location of the user in distress and communicating the information to the central control station 20. The central control station in turn relays the location information to the receiving party.

Most preferably, the internal navigation system, or a portion thereof, is included in the cellular telephone 50 as a location identification circuit 140 (FIG. 3). When the signal for emergency dialing is received by the control unit 70 as described above, the control unit activates the location identification circuit 140. The location identification circuit 140 in combination with the control unit 70 receive position information through the rf circuit 72 from one or more preestablished reference sites which are located about the region 14. Based on information received from the reference site or sites, the location identification circuit 140 determines the location of the user in distress relative to the reference site. The location information is communicated to the control unit 70 by way of line 142 then encoded and transmitted over the cellular link to the emergency number dialed. As a result, the proper authorities are notified of the location of the user in distress, and help can be dispatched.

The location information transmitted from the cellular telephone 50 preferably is in the form of location coordinates, for example longitude and latitude, which correspond to those on a map of the region 14. As described above, these coordinates may be converted manually or electronically in order to arrive at a more workable street address or the like. The location information is encoded on the rf signal preferably using a DTMF encoding scheme, although other encoding schemes are also applicable.

In a preferred embodiment, the location identification circuit 140 establishes a link with a navigational satellite 35, as is shown in FIG. 8. Using location principles commonly employed with surveying equipment, the cellular telephone 50 communicates with the satellite 35 in order to determine the location of the user in distress. The cellular telephone processes the information received from the satellite 35 to arrive at the location coordinates, and the location information is then communicated by the cellular telephone 50 to the appropriate party.

In still another embodiment, the location identification circuit 140 actively communicates with one or more rf transmission stations 18 which serve as reference sites. The rf transmission stations 18 transmit location reference information which the cellular telephone 50 receives and utilizes to determine the location of the user. The actual location of the user is determined using techniques such as those employed in long range navigation (LORAN) systems used in boating, or another type of global positioning system such as Rockwell International's GPS. Based on the signals received from the rf transmission stations 18 serving as beacons, the location identification circuit determines the location of the user in distress and again the information is communicated to the appropriate party.

While the invention has been described above in the context of the user in distress remaining at a fixed location, there are situations which can arise where the user in distress changes location within the region 14. For example, the cellular telephone user could be assaulted in his or her own car and ordered to drive somewhere. As another example, a user having a portable cellular telephone could be kidnapped and mobilized without knowledge of his or her destination. Alternatively, the user involved in an accident or under medication may be so disoriented that, although the user is able to activate the location identification system, he or she continues to travel about during such time as it takes for help to arrive.

In such situations, the location identification system 123 and/or the location identification circuit 140 of the cellular telephone 50 operates to provide updated information regarding the location of the user in distress. Using the location identification system 123 shown in FIG. 5 wherein the cellular telephone 50 functions mainly as a passive emitter, the direction finding equipment (124, 125,126) at the central control station 20 continuously updates the reading on the location of the user. Whenever the location of the user in distress changes as compared to the previous reading, preferably the new location information is communicated to the proper authority as described above.

Figure 9:
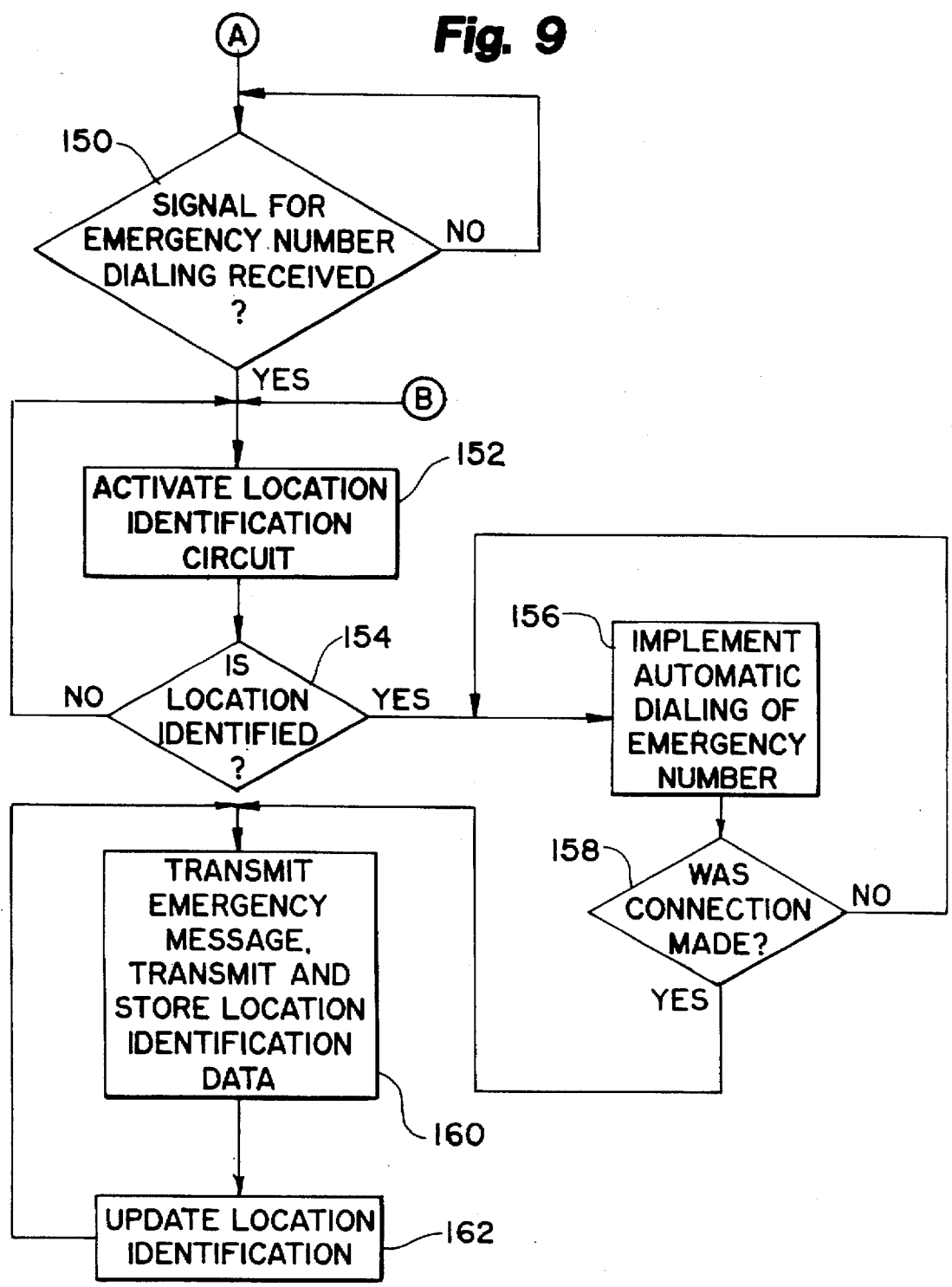
FIG. 9 is a flow chart showing the system logic for the location identification section of the cellular mobile telephone in accordance with the present invention.

Alternatively, in an embodiment where the cellular telephone 50 actively determines the location of the user in distress such as in the system described with respect to FIG. 8, the location identification circuit 140 provides the updated information to the proper authorities. In FIG. 9, a system flow chart for the emergency message dialing procedure including location update provisions is shown.

Referring to FIG. 9, generally, the cellular telephone 50 is in state A which represents the standby mode. The control unit 70 of the cellular telephone 50 then awaits the arrival of the signal (e.g., as a result of the crash detector 66, the depression of the emergency button 64, etc.) indicating that a request for emergency number dialing has been made, as is shown in step 150. When such signal is received, the control unit 70 activates the location identification circuit 140 as is shown in step 152 by way of control/data line 142. The location identification circuit 140 then attempts to communicate through the rf circuit 72 with the satellite 35, rf transmission station 18, or other reference site or sites so that the location identification circuit 140 is able to determine the location of the user.

In step 154, the control unit 70 determines whether the location of the user has in fact been identified, preferably by the setting of a flag. If not, control is returned to step 152 and the location identification circuit 140 again attempts to identify the user location. After the location has been identified, the control unit 70 implements the automatic dialing of the emergency number stored in memory 76 as described above and as is shown in step 156. After the connection is determined to have been made in step 158, the cellular telephone 50 in step 160 transmits the emergency message to the receiving party along with the location information determined in step 152. The receiving party processes the location information and help can be dispatched. However, in the event the connection was not made in step 158, control is returned to step 156 and the automatic dialing procedure is re-implemented.

After the location of the user in distress initially has been transmitted to the receiving party in step 160, the location identification circuit periodically updates the location of the user as is shown in step 162. Control is returned to step 160 after each update, and the updated location information is transmitted to the receiving party. In one embodiment, the updated location information is transmitted after each update. Alternatively, the control unit can by programmed to retransmit the updated location information only if the location of the user in distress has changed since the previous determination. This can be accomplished by storing the location information in memory after each transmission and by comparing the updated information with that of the previous update. If the location changes, transmission of the updated information will proceed as before.

As with the system flow chart shown in FIG. 4, if at any time during the emergency dialing procedure the user inputs an "end transmission" code, the cellular telephone 50 will terminate the connection and return to state A. Moreover, if for some reason the connection is lost during the emergency dialing procedure, the cellular telephone will go to state B. From state B, the cellular telephone will proceed with steps 152–162 as before in activating the location identification circuit 140 and in implementing the automatic dialing.

As a result, the cellular telephone 50 of the present invention operates within the system 10 to provide the automatic dialing of an emergency number and the playing of an emergency message. In addition, the cellular telephone 50 serves to determine and provide location information concerning the location of the user in distress. The location information can be provided to the receiving party regardless of whether or not the user has lost consciousness. Help is then dispatched, where otherwise the user would not be able to verbally communicate his or her location.

There are other scenarios in which the present invention would be useful; only a few have been described herein. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

I claim:

1. A cellular telephone, comprising:

a receiver for receiving cellular radio communications;

a transmitter for transmitting cellular radio communications;

a controller coupled to the receiver and to the transmitter;

an operator input device coupled to the controller, the operator input device receiving operator inputs and providing operator input signals to the controller indicative of the operator inputs;

an emergency input key coupled to the controller, the emergency input key receiving an operator emergency input and providing an emergency input signal to the controller indicative of the operator emergency input;

a crash detector, coupled to the controller, sensing parameters indicative of a crash and providing a crash signal to the controller indicative of the parameters sensed;

a first memory coupled to the controller and storing a pre-programmed telephone number corresponding to an emergency responder;

a second memory coupled to the controller and storing a pre-recorded emergency message including identification information associated with a user of the cellular telephone;

a microphone coupled to the controller and providing voice signals to the controller in response to the user speaking into the microphone;

wherein the controller is configured to detect a distress situation based on inputs from the emergency input key and the crash detector, and to access the first memory and initiate cellular communication using the pre-programmed telephone number and to access the second memory and play the pre-recorded message repeatedly once cellular communication has been initiated and established with the emergency responder, and wherein the controller is further configured to stop playing the pre-recorded message and transmit voice information based on inputs from the microphone and the operator input device.

2. The cellular telephone of claim 1 wherein the crash detector comprises:

an impact detector coupled to the controller and configured to be coupled to at least one of the front and rear bumpers of a vehicle within which the cellular telephone is located and to provide an impact signal to the controller in response to sensing impact.

3. The cellular telephone of claim 1 wherein the crash detector comprises:

a sonic detector coupled to the controller and configured to detect the sound of breaking glass and provide a crash signal to the controller in response to detecting the sound of breaking glass.

4. The cellular telephone of claim 1 wherein the crash detector comprises:

an accelerometer, coupled to the controller, in providing the controller with a crash signal in response to the accelerometer measuring physical characteristics indicative of a crash.

5. The cellular telephone of claim 1 wherein the crash detector comprises:

a motion detector coupled to the controller and detecting motion indicative of a crash and providing a crash signal to the controller in response to detecting the motion indicative of a crash.

6. In combination, a cellular telephone and a base station the cellular telephone comprising:

a receiver for receiving cellular radio communications;

a transmitter for transmitting cellular radio communications;

a controller coupled to the receiver and to the transmitter;

an operator input device coupled to the controller, the operator input device receiving operator inputs and providing operator input signals to the controller indicative of the operator inputs;

an emergency input key coupled to the controller, the emergency input key receiving an operator emergency input and providing an emergency input signal to the controller indicative of the operator emergency input;

a crash detector, coupled to the controller, sensing parameters indicative of a crash and providing a crash signal to the controller indicative of the parameters sensed;

a first memory storing a pre-programmed telephone number corresponding to an emergency responder;

a second memory coupled to the controller and storing a pre-recorded emergency message including identification information associated with a user of the cellular telephone;

a microphone coupled to the controller and providing voice signals to the controller; and wherein the controller is configured to detect a distress situation based on inputs from the emergency input key and the crash detector, and to access the first memory and initiate cellular communication using the pre-programmed telephone number and to access the second memory and play the pre-recorded message repeatedly once cellular communication has been initiated and established with the emergency responder, and wherein the controller is further configured to stop playing the pre-recorded message and transmit voice information based on inputs from the microphone and the operator input device; and the base station comprising:

a location detector configured to locate the cellular telephone; and a notifier configured to notify a nearest emergency responder located geographically nearest the location of the cellular telephone.

7. The combination of claim 6 wherein the controller of the cellular telephone is further configured to generate a distress signal in response to receiving the crash signal from the crash detector, the controller transmitting the distress signal; and wherein the location detector of the base station is configured to locate the cellular telephone in response to the distress signal being transmitted from the cellular telephone.

8. The combination of claim 7 wherein the distress signal is more powerful than a typical cellular radio communication signal transmitted by the transmitter.

9. The combination of claim 6 wherein the notifier of the base station is configured to provide the emergency responder with geographic information indicative of the location of the cellular telephone.

* * * * *